United States Patent
Pollack et al.

(10) Patent No.: US 11,637,886 B2
(45) Date of Patent: Apr. 25, 2023

(54) CELLULAR COMMUNICATION PROTOCOL AWARE MULTIMEDIA STREAMING

(71) Applicant: Apple Inc., Cupertino, CA (US)

(72) Inventors: Daniel B. Pollack, Cupertino, CA (US); Karthick Santhanam, Campbell, CA (US); Christopher M. Garrido, Santa Clara, CA (US); Jingyao Zhang, Sunnyvale, CA (US); Ming Jin, Saratoga, CA (US); Hyeonkuk Jeong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 17/168,107

(22) Filed: Feb. 4, 2021

(65) Prior Publication Data

US 2022/0103611 A1 Mar. 31, 2022

Related U.S. Application Data

(60) Provisional application No. 63/083,809, filed on Sep. 25, 2020.

(51) Int. Cl.
*H04L 65/80* (2022.01)
*H04N 21/24* (2011.01)
(Continued)

(52) U.S. Cl.
CPC .......... *H04L 65/80* (2013.01); *H04L 65/612* (2022.05); *H04L 65/70* (2022.05); *H04N 21/2402* (2013.01); *H04W 16/14* (2013.01)

(58) Field of Classification Search
CPC ....... H04L 65/80; H04L 65/612; H04L 65/70; H04N 21/2402; H04N 21/23439; H04N 21/44004; H04N 21/4621; H04N 21/4622; H04N 21/6131; H04W 16/14; H04W 76/10; H04W 88/06
See application file for complete search history.

(56) References Cited

U.S. PATENT DOCUMENTS 9,084,166 B1 * 7/2015 Vargantwar ........... H04W 36/14
9,215,623 B1 * 12/2015 Oroskar ................ H04W 36/00
(Continued)

FOREIGN PATENT DOCUMENTS

WO WO-2021215975 A1 * 10/2021

*Primary Examiner* — Oanh Duong
(74) *Attorney, Agent, or Firm* — BakerHostetler (57) ABSTRACT

A device implementing cellular communication protocol aware multimedia streaming may include at least one processor configured to establish a link for communicating with another device, wherein the link utilizes at least one of a first cellular communication protocol or a second cellular communication protocol. The at least one processor may be configured to determine a bit rate for a video stream to be provided to the other device based at least in part on whether the link utilizes the first cellular communication protocol or the second cellular communication protocol, wherein a first bit rate is determined when the link utilizes the first cellular communication protocol and a second bit rate is determined when the link utilizes the second cellular communication protocol. The at least one processor may be configured to provide, for transmission over the link to the other electronic device, the video stream at the determined bit rate.

21 Claims, 6 Drawing Sheets

(51) Int. Cl.
*H04W 16/14* (2009.01)
*H04L 65/70* (2022.01)
*H04L 65/612* (2022.01)

(56) References Cited

U.S. PATENT DOCUMENTS

| | | | |
|---|---|---|---|
| 9,386,563 B1* | 7/2016 | Oroskar | H04W 72/0406 |
| 11,159,433 B1* | 10/2021 | Slater | H04L 65/752 |
| 2016/0323408 A1* | 11/2016 | Chung | H04L 67/1004 |
| 2021/0112295 A1* | 4/2021 | Birkbeck | H04N 21/812 |
| 2021/0329057 A1* | 10/2021 | Wang | H04L 65/80 |

* cited by examiner

CELLULAR COMMUNICATION PROTOCOL AWARE MULTIMEDIA STREAMING

CROSS REFERENCE TO RELATED APPLICATIONS

This application claims the benefit of U.S. Provisional Patent Application No. 63/083,809, entitled "Cellular Communication Protocol Aware Multimedia Streaming," filed on Sep. 25, 2020, the disclosure of which is hereby incorporated herein in its entirety.

TECHNICAL FIELD

The present description relates generally to multimedia streaming, including cellular communication protocol aware multimedia streaming.

BACKGROUND

A user of an electronic device may participate in a communication session, such as an audio and/or video conference session, with one or more other participants using their respective devices. Each of the participant devices may have respective communication interfaces (e.g., Wi-Fi and/or cellular) each of which may have different operational characteristics.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Applications that stream multimedia content to an electronic device, such as from a server or from another electronic device, may provide different streaming settings and/or streaming options based on whether the electronic device is connected via a Wi-Fi connection or a cellular connection. For example, an application may allow a user to set different maximum bit rates for a Wi-Fi connection and a cellular connection (irrespective of the particular communication protocol (e.g., 3G, LTE, 4G, etc.) being used for the cellular connection).

However, with the advent of the 5G cellular communication protocol (e.g., the 3GPP 5G protocol), the bandwidth available when communicating over a connection that utilizes the 5G cellular communication protocol may significantly exceed the bandwidth available when utilizing other cellular communication protocols (e.g., 2G, 3G, LTE, 4G, etc.). Furthermore, other operational characteristics (e.g., thermals, power consumption, link stability, etc.) associated with the 5G cellular communication protocol may significantly differ from those associated with other cellular communication protocols. Thus, an application that only differentiates between Wi-Fi and cellular connections may be unable to properly account for the significant differences in bandwidth and other operational characteristics between different cellular communication protocols, e.g., 5G and other cellular communication protocols (e.g., 2G, 3G, LTE, 4G, etc.).

Furthermore, there may be different types of cellular communications within the 5G cellular communication protocol, such as sub-6 communications that utilize a frequency spectrum that is below 6 Gigahertz (e.g., FR1), and millimeter wave (e.g., mmWave) communications that utilize a frequency spectrum that is above 24 Gigahertz (e.g., FR2). Due to the frequency variance between these spectrums, the two different types of 5G cellular communications may also have significantly varying operational characteristics, such as different thermal characteristics, different interference characteristics, and the like. Thus, even differentiating between different cellular communication protocols may not be sufficient to properly differentiate between the different types of cellular communications within the 5G cellular communication protocol.

In the subject system, an electronic device that is streaming multimedia content from a server and/or from another electronic device may determine an appropriate bit rate for streaming the multimedia content based at least in part on the particular cellular communication protocol (e.g., 3G, LTE, 4G, 5G, etc.) being utilized by the electronic device, as well as the particular type of communication within the cellular communication protocol when applicable, such as when electronic device is using the 5G cellular communication protocol. Furthermore, in the instance that the electronic device is streaming the multimedia content from another electronic device, such as for a multimedia conference session, the electronic device may receive an indication of the particular cellular communication protocol being used by the other electronic device (if any) as well as the particular type of communication within the cellular communication protocol, such as when the other electronic device is using, e.g., the 5G cellular communication protocol.

Thus, instead of merely differentiating between a cellular communication protocol and a Wi-Fi communication protocol, the electronic device can discretely differentiate between different cellular communication protocols, as well as different types of communications within the different types of cellular communication protocols, when determining an appropriate bit rate for streaming multimedia content, and/or when determining other application settings that may be impacted by the different operational characteristics of the different cellular communication protocols (and/or types thereof).

Although the subject system is primarily described herein with respect to different cellular communication protocols (and/or types thereof), the subject system is equally applicable to different Wi-Fi communication protocols (and/or types thereof), such as Wi-Fi 5 (802.11ac), Wi-Fi 6 (802.11ax), and the like, as well as any other communication protocols that may, for example, support different types of communications (such as over varying frequency ranges) that may be associated with one or more different operational characteristics.

Figure 1:
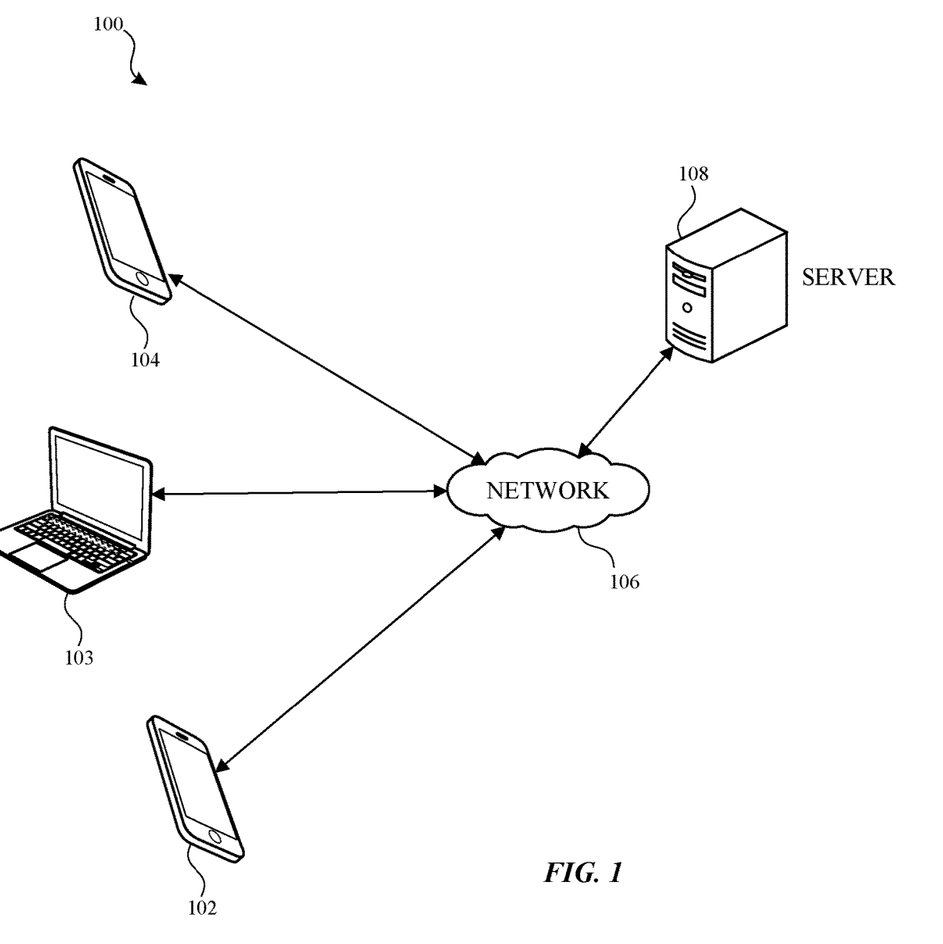
FIG. 1 illustrates an example network environment for cellular communication protocol aware multimedia streaming in accordance with one or more implementations.

FIG. 1 illustrates an example network environment for cellular communication protocol aware multimedia streaming in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, and 104, a network 106 and a server 108. The network 106 may communicatively (directly or indirectly) couple, for example, any two or more of the electronic devices 102-104 and/or the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

The server 108 may be, and/or may include all or part of the electronic system discussed below with respect to FIG. 6. The server 108 may include one or more servers, such as a cloud of servers, that may be used to facilitate in audio-video conferencing between the electronic devices 102-104. For explanatory purposes, a single server 108 is shown and discussed with respect to various operations, such as facilitating audio-video conferencing (e.g., multimedia conferencing). However, these and other operations discussed herein may be performed by one or more servers, and each different operation may be performed by the same or different servers.

One or more of the electronic devices 102-104 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN (e.g., Wi-Fi) radios, cellular radios, Bluetooth radios, Zigbee radios, near field communication (NFC) radios, and/or other wireless radios. In FIG. 1, by way of example, the electronic devices 102 and 104 are each depicted as a smartphone and the electronic device 103 is depicted as a laptop computer.

The electronic devices 102-104 may be configured to participate in communication sessions, such as audio-video conferencing (and/or multimedia conferencing) sessions, for example, where two or more of the electronic devices 102-104 may participate in a conversation in which video and/or audio content streams (e.g., application data) are transmitted between the participant devices. Each of the electronic devices 102-104 may be, and/or may include all or part of, the device discussed below with respect to FIG. 2, and/or the electronic system discussed below with respect to FIG. 6.

In the subject system, when a user of one of the electronic devices 102-104, such as the electronic device 102, initiates a communication session (e.g., an audio-video and/or multimedia conference session) with a user of another of the electronic devices 103-104, such as the electronic device 104, the electronic devices 102, 104 may attempt to establish a primary connection via a preferred link for communicating between the electronic devices 102, 104. For example, the electronic devices 102, 104 may attempt to establish the primary connection for communicating between the Wi-Fi communication interfaces of the electronic devices 102, 104.

A 'link,' as used herein, may refer to a particular communication path for communicating between two of the electronic devices 102-104, such as the electronic devices 102 and 104. A link may be characterized by a set of link parameters (or attributes) that may include one or more of: a particular local communication interface (e.g., Wi-Fi, cellular, etc.), a particular local communication protocol (e.g., Wi-Fi 5, Wi-Fi 6, 3G, 4G, LTE, 5G, etc.), a particular type of the local communication protocol (when applicable, such as sub-6 or millimeter wave for 5G), a particular remote communication interface, a particular remote communication protocol, a particular type of the remote communication protocol (when applicable), a packet type (e.g., user datagram protocol (UDP), transmission control protocol (TCP), etc.), an internet protocol (IP) version type (e.g., IPv4, IPv6, etc.), a connection type, e.g. peer-to-peer or through the server 108 (e.g., a relay server), and/or generally any configurable properties/parameters of a link. Thus, the electronic devices 102, 104 may establish different links by utilizing a different set of link parameters for each link. In one or more implementations, different applications and/or communication sessions may be associated with different sets of preferred link parameters.

Once a primary connection is established for the communication session between the electronic devices 102, 104, the electronic devices 102, 104 may evaluate the additional available links to establish a secondary connection for the communication session The secondary connection may be established via a link that is diverse from the link used for the primary connection. For example, the primary connection may utilize a first cellular communication protocol (e.g., 5G), while the secondary connection may utilize a second, different, cellular communication protocol, such as LTE. Once the secondary connection is established, the electronic devices 102, 104 may transmit a copy of at least a portion of the control data for the communication session over the secondary connection. In this manner, the control data can be redundantly transmitted over the secondary connection. An example process of establishing primary and secondary connections using different cellular communication protocols is discussed further below with respect to FIG. 4.

After establishing a primary and/or secondary connection with the other electronic device 104, the electronic device 102 may determine an appropriate bit rate for streaming multimedia content to and/or from the other electronic device 104, such as for the communication session. For example, the electronic device 102 may evaluate the remote and local communication protocols utilized by the link, as well as the particular types of the communication protocols (if any), in order to determine the appropriate bit rate. In one or more implementations, the electronic device 102 may further consider a user preference with respect to cellular bandwidth consumption, and/or a cellular carrier indication of the cost of the cellular bandwidth, when determining the appropriate bit rate. An example process of selecting an appropriate bit rate based on the cellular communication protocol(s) utilized for a link is discussed further below with respect to FIG. 3.

Figure 5:
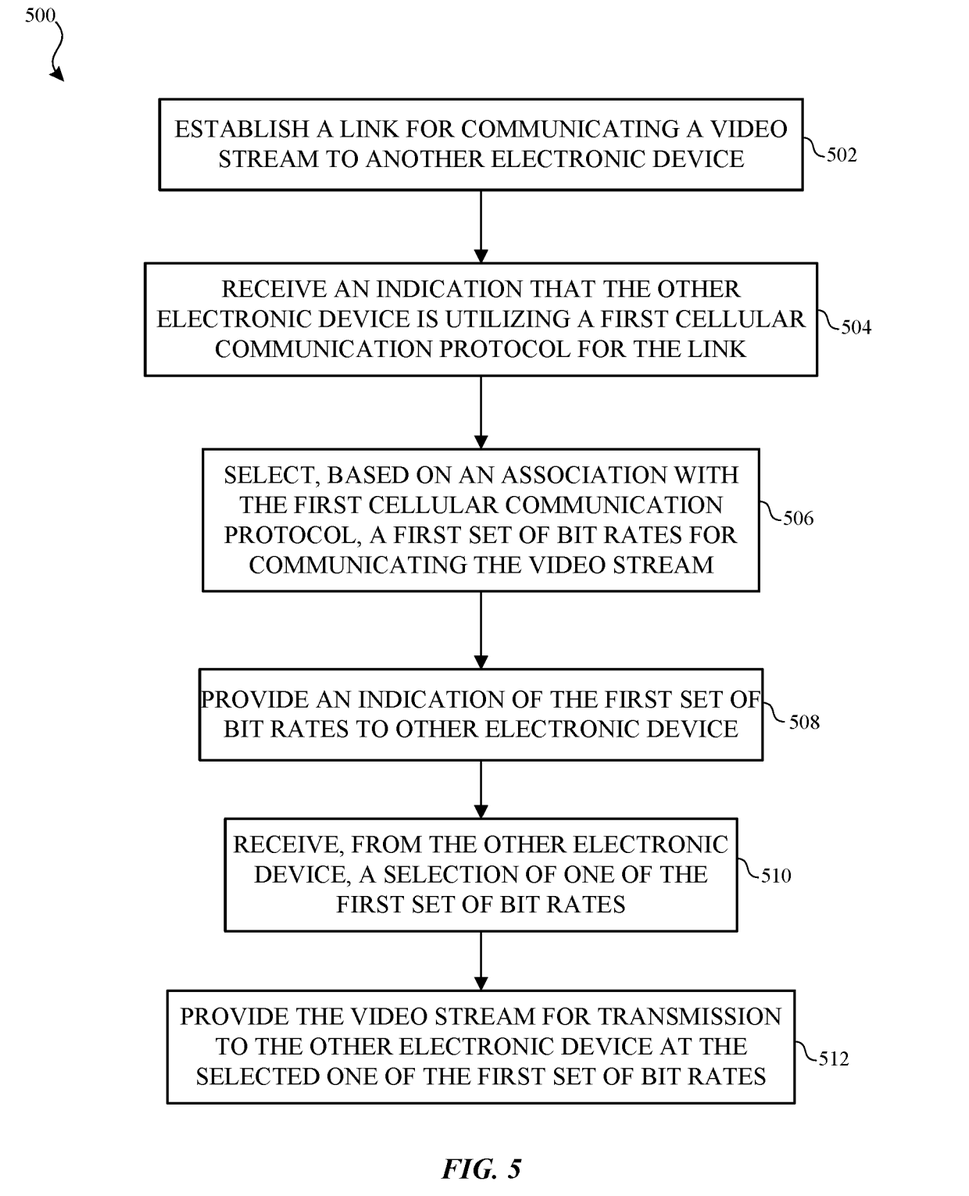
FIG. 5 illustrates a flow diagram of an example process of cellular communication protocol aware adaptive bit rate multimedia streaming in accordance with one or more implementations.

In the instance that the electronic device 102 is receiving and/or transmitting multimedia content via adaptive bit rate (ABR) streaming, the electronic device 102 may select the appropriate bit rate to receive content and/or the appropriate tier of bit rates for advertising available content based at least in part on the remote and/or local communication protocols utilized by the link, as well as the particular types of the communication protocols (if any), as is discussed further below with respect to FIG. 5.

Figure 2:
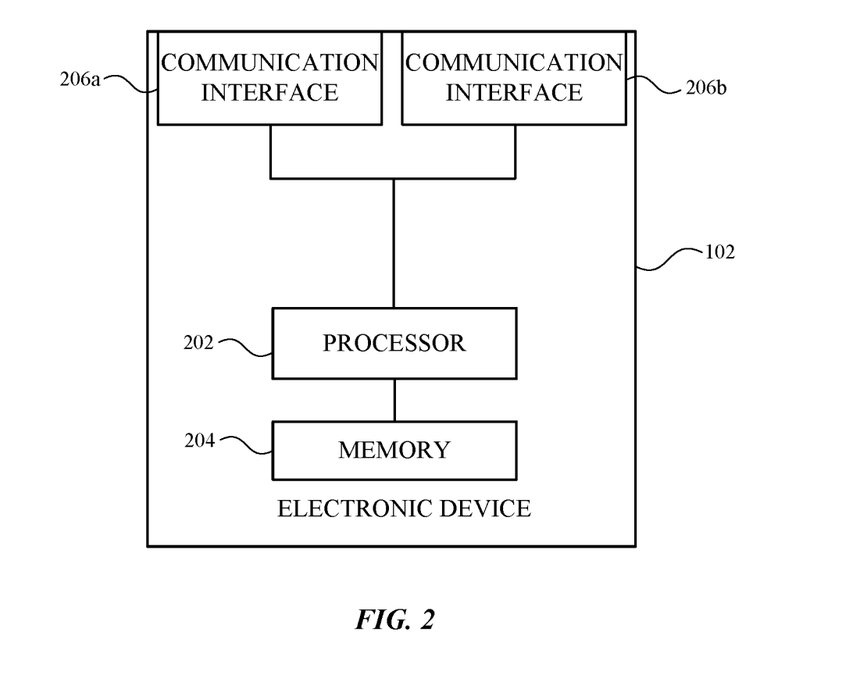
FIG. 2 illustrates an example device that may implement cellular communication protocol aware multimedia streaming in accordance with one or more implementations.

FIG. 2 illustrates an example electronic device 102 that may implement cellular communication protocol aware multimedia streaming in accordance with one or more implementations. For example, the electronic device 102 of FIG. 2 can correspond to any of the electronic devices 102-104, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, and communication interfaces 206a-206b. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The memory 204 may store an application (e.g., an audio-video conferencing application) which is configured to facilitate using multiple connections within an audio-video conference session. In one or more implementations, the audio-video conferencing application may be part of or otherwise incorporated within an operating system of the electronic device 102.

In one or more implementations, the memory 204 may store a jitter buffer that may be used during an audio-video conference session. The jitter buffer may be used to ensure the continuity of decoded audio data by smoothing out packet arrival times during periods of network congestion. Thus, the size of the jitter buffer may be indicative of a minimum amount of time from when a packet, such as an audio packet, is received at the electronic device 102 until when the packet will be decoded and presented to the user of the electronic device 102. Accordingly, when there is significant variability and/or instability in a link, such as over 5G millimeter wave communications, the minimum jitter buffer level may be set higher than when there is more stability in a link, such as over 5G sub-6 communications, LTE communications, and the like.

The communication interfaces 206a-206b may include suitable logic, circuitry, and/or code that enables wired or wireless communication, such as between any of the other electronic devices 103-104 and/or the server 108 over the network 106. In one or more implementations, all or part of the same circuitry may be shared by both of the communication interfaces 206a-206b. The communication interfaces 206a-206b may include, for example, one or more of a Bluetooth communication interface, a cellular communication interface (e.g., 3G, 4G, LTE, 5G, etc.), an NFC interface, a Zigbee communication interface, a WLAN communication interface (e.g., Wi-Fi, WLAN/BT combination, WiMAX, LiFi, 2.4 GHz, 5 GHz, etc.), a USB communication interface, an Ethernet communication interface, a millimeter wave (e.g., 60 GHz) communication interface, or generally any communication interface. In the instance that one or more of the communication interfaces 206a-206b, such as the communication interface 206a, supports the 5G cellular communication protocol, the communication interface 206a may support different types of 5G cellular communications, such as sub-6 (e.g., communications in a frequency spectrum below 6 Gigahertz), and/or millimeter wave (e.g., communications in a frequency spectrum above 24 Gigahertz).

In one or more implementations, when one of the communication interfaces 206a-206b, such as the communication interface 206a, is capable of communicating via different communication protocols, standards, and/or frequencies, such as LTE, 5G, etc., each of the different communication protocols, standards, and/or frequencies may be considered a different link parameter for purposes of establishing available links with another electronic device.

For explanatory purposes, the electronic device 102 is illustrated in FIG. 2 as including two communication interfaces 206a-206b; however, the electronic device 102 may include any number of communication interfaces.

In one or more implementations, one or more of the processor 202, the memory 204, the communication interfaces 206a-206b, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
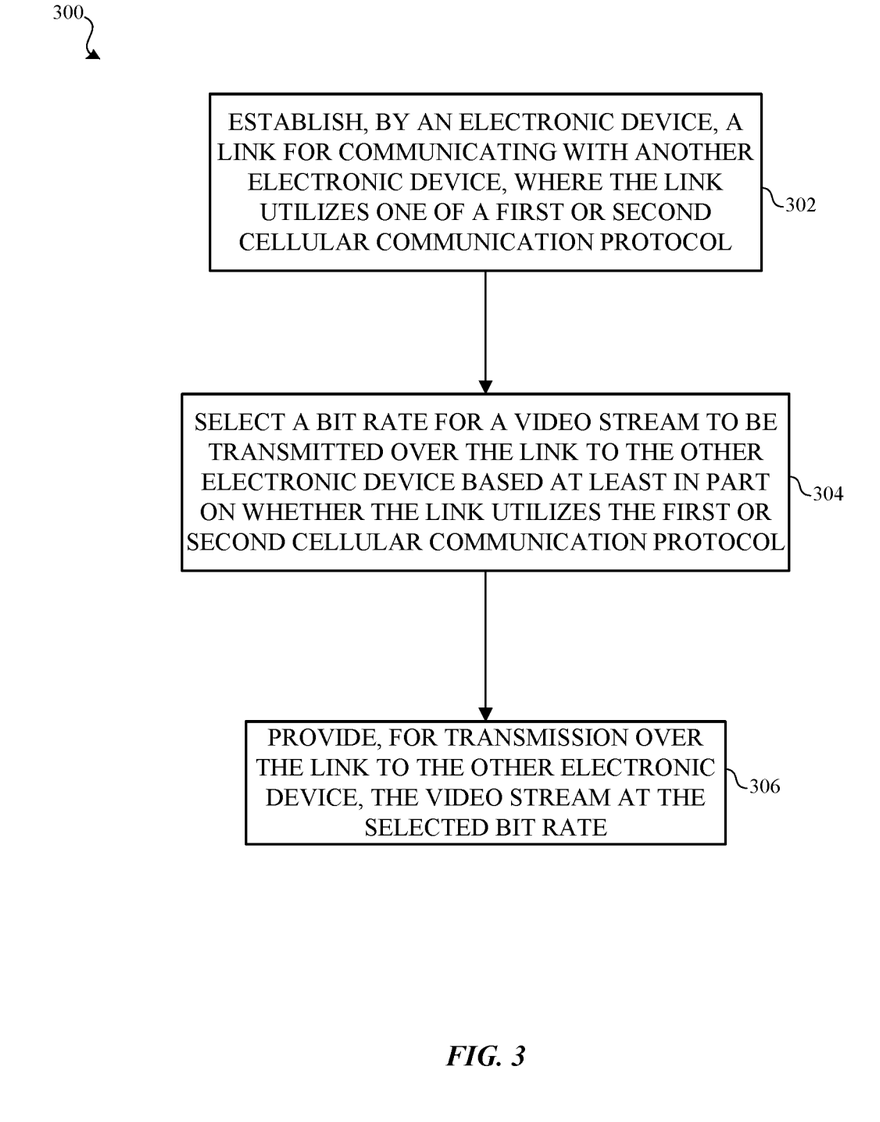
FIG. 3 illustrates a flow diagram of an example process of cellular communication protocol aware multimedia streaming in accordance with one or more implementations.

FIG. 3 illustrates a flow diagram of an example process 300 of cellular communication protocol aware multimedia streaming in accordance with one or more implementations. For explanatory purposes, the process 300 is primarily described herein with reference to the electronic devices 102, 104 of FIG. 1. However, the process 300 is not limited to the electronic devices 102, 104 of FIG. 1, and one or more blocks (or operations) of the process 300 may be performed by one or more other components of the server 108 and by other suitable devices (e.g., any of the electronic devices 102-104). Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The electronic device 102 may establish a link for communicating with another electronic device 104, where the link utilizes one of a first cellular communication protocol (e.g., LTE) or a second cellular communication protocol (e.g., 5G) (302). For example, the electronic device 102 may utilize one of the first or second cellular communication protocols for the link, and/or the other electronic device 104 may utilize one of the first or second cellular communication protocols for the link. In this regard, the electronic device 102 may receive an indication of the particular communication protocol being utilized by the other electronic device 104 for the link.

The electronic device 102 selects a bit rate for a video stream to be transmitted over the link to the other electronic device 104 based at least in part on whether the link utilizes the first cellular communication protocol or the second cellular communication protocol (304). For example, different bit rates may be stored, for example, in the memory 204 in association with the different communication protocols and/or different pairs (or sets) of communication protocols. For example, if both of the electronic devices 102, 104 are utilizing either the 5G cellular communication protocol or Wi-Fi, the electronic device 102 may select a first bit rate for the video stream, such as 4 Megabits per second (Mbps). Alternatively, if one of the electronic devices 102, 104 is using the LTE cellular communication protocol, and the other of the electronic devices 102, 104 is using LTE, 5G, or Wi-Fi, the electronic device may select a second bit rate for the video stream, such as 600 kilobits per second (kbps). Alternatively, if both of the electronic devices 102, 104 are using the 2G and/or 3G cellular communication protocol, the electronic device 102 may select a third bit rate for the video stream, such as 200 kbps.

In one or more implementations, in addition to selecting the bit rate for a video stream, the electronic device 102 may also select an audio quality for a corresponding audio stream. Similar to the bit rate for the video stream, the audio quality may be increased (resulting in higher bandwidth consumption), and/or decreased (resulting in lower bandwidth consumption) based on the communication protocols utilized for the link.

In one or more implementations, the electronic device 102 may provide a user setting for indicating whether the user has a preference regarding bandwidth consumption. For example, the user may be able to indicate that they would like to constrain bandwidth consumption (such as in general and/or discretely for one or more particular communication protocols). If the user setting has been set to indicate that bandwidth should be conserved for the communication protocol being utilized by the electronic device 102 for the link, the electronic device 102 may incorporate the user setting into the bit rate selection, such as by reducing the bit rate for the video stream (when possible).

In one or more implementations, the electronic device 102 may receive, from the cellular carrier that provides cellular service to the electronic device 102, a cellular carrier indication of a current cellular bandwidth consumption cost to the user. For example, the user may have unlimited cellular data in which case the cellular bandwidth consumption cost may be low. However, if the user has a limit on their cellular bandwidth, and/or if the user pays for cellular bandwidth on a per usage basis, the cellular carrier indication may indicate that the current cellular bandwidth consumption cost to the user is high. If the electronic device 102 receives a cellular carrier indication that the current cellular bandwidth consumption cost is high, the electronic device 102 may incorporate the indication into the bit rate selection, such as by reducing the bit rate for the video stream (when possible).

In one or more implementations, the electronic device 102 may select the bit rate based on whether the link utilizes the first and/or second cellular communication protocols and independent of the current bandwidth availability corresponding to the first or second cellular communication protocols. For example, even though a 5G cellular communication protocol may have a current bandwidth availability, for example, of 100 Mbps or greater, the electronic device 102 may still select a bit rate of, e.g., 4 Mbps, as is stored in the memory 204 in association with the 5G cellular communication protocol.

After selecting the bit rate (304), the electronic device 102 may provide the video stream for transmission over the link to the other electronic device 104 at the selected bit rate (306). In one or more implementations, the electronic device 102 may also apply redundancy and/or additional redundancy, such as forward error correction (FEC) coding, when the available bandwidth for the link exceeds the bit rate being utilized for the video stream, such as when both of the electronic devices 102, 104 are utilizing the 5G cellular communication protocol.

In the instance that the electronic devices 102, 104 are utilizing adaptive bit rate streaming for the video stream, the electronic device 102 may select a set and/or tier of bit rates based on whether the link utilizes the first cellular communication protocol or the second cellular communication protocol, and may advertise the set of bit rates to the electronic device 104. The electronic device 104 may respond with a selection of an appropriate bit rate and the electronic device 102 may transmit the video stream at the selected bit rate. An example process of cellular communication protocol aware adaptive bit rate streaming is discussed further below with respect to FIG. 5.

Figure 4:
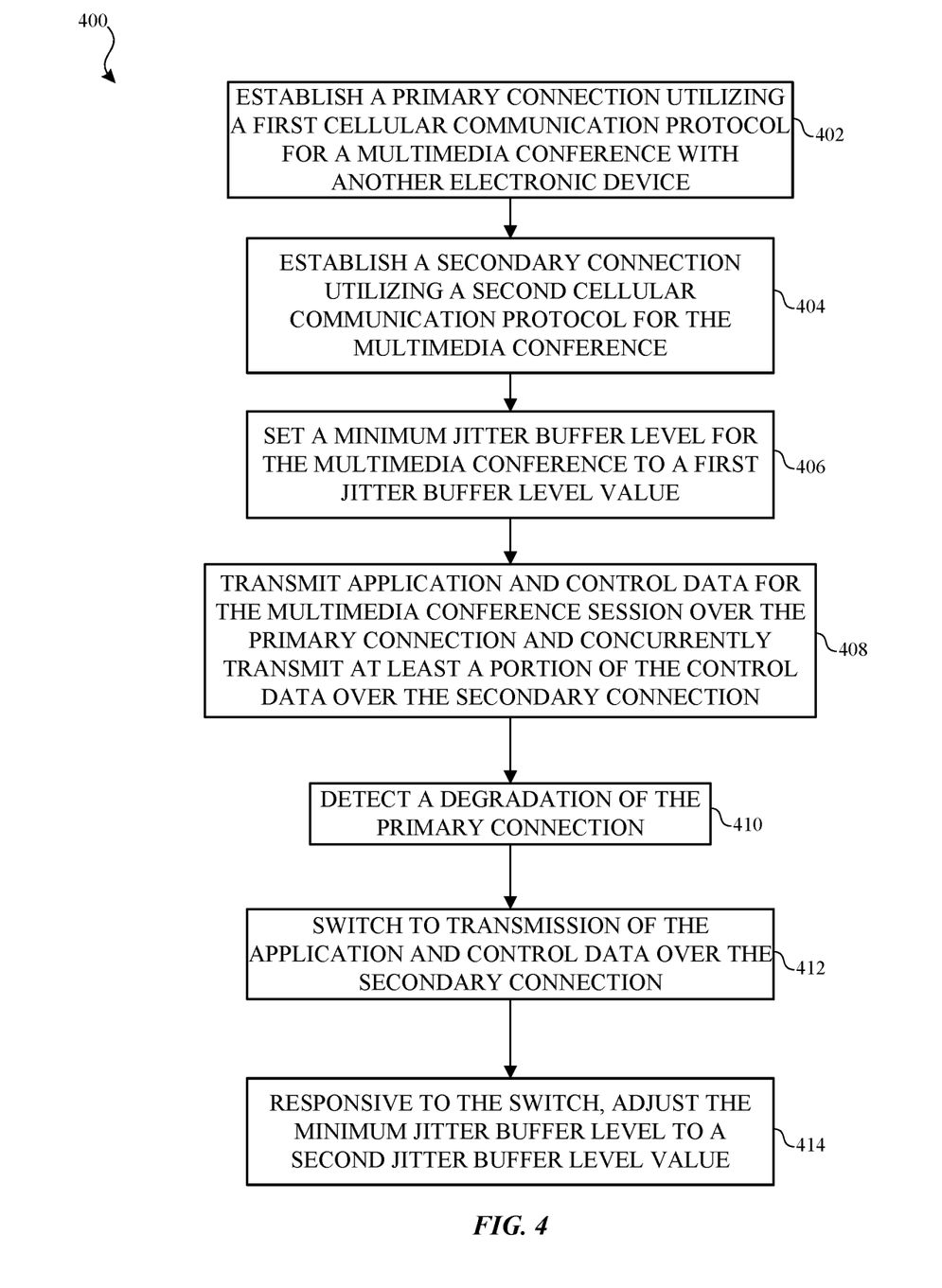
FIG. 4 illustrates a flow diagram of an example process of cellular communication protocol aware jitter buffer depth adaptation in accordance with one or more implementations.

FIG. 4 illustrates a flow diagram of an example process 400 of cellular communication protocol aware jitter buffer depth adaptation in accordance with one or more implementations. For explanatory purposes, the process 400 is primarily described herein with reference to the electronic devices 102, 104 of FIG. 1. However, the process 400 is not limited to the electronic devices 102, 104 of FIG. 1, and one or more blocks (or operations) of the process 400 may be performed by one or more other components of the server 108 and by other suitable devices (e.g., any of the electronic devices 102-104). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The electronic device 102 may establish a primary connection utilizing a first cellular communication protocol for a multimedia conference session with another electronic device 104 (402). In one or more implementations, the electronic device 102 may utilize the first cellular communication protocol for the link and/or the electronic device 104 may utilize the first cellular communication protocol for the link.

The electronic device 102 may establish a secondary connection utilizing a second cellular communication protocol for the multimedia conference session, where the second cellular communication protocol differs from the first cellular communication protocol (404). In one or more implementations, the electronic device 102 may utilize the second cellular communication protocol for the link and/or the electronic device 104 may utilize the second cellular communication protocol for the link.

For example, one or more of the electronic devices 102, 104 may utilize the 5G cellular communication protocol for the primary connection, and one or more of the electronic devices 102, 104 may utilize the LTE and/or 4G cellular communication protocol for the secondary connection. Since the 5G cellular communication protocol may utilize different base stations and/or frequencies (e.g., with different interference characteristics) than the LTE and/or 4G cellular communication protocol, the electronic device 102 may experience degraded connectivity over the 5G cellular communication protocol without experiencing the degraded connectivity over the LTE and/or 4G cellular communication protocol, and/or vice-versa.

The electronic device 102 may set a minimum jitter buffer level to a first jitter buffer value for the multimedia conference session, where the first minimum jitter buffer level (and/or a minimum jitter buffer level variance) is pre-stored in the memory 204 in association with the first cellular communication protocol (406). The electronic device 102 may communicate the first minimum jitter buffer level to the electronic device 104 such that the electronic devices 102, 104 may synchronize their respective minimum jitter buffer levels.

For example, for cellular communication protocols that may be significantly and/or rapidly impacted by interference (such as 5G millimeter wave), the minimum jitter buffer level may be set higher such that if the link rapidly degrades the jitter buffers may not empty. However, for cellular communication protocols that are not as severely and/or immediately impacted by interference, such as LTE, 5G sub-6, etc., the minimum jitter buffer levels may be set lower, which may reduce the delay in outputting the decoded audio. Thus, the minimum jitter buffer levels may be set to different values based on the particular cellular communication protocol(s) (and/or type(s) thereof) utilized by the link.

In this regard, the memory 204 may store a mapping and/or association between different jitter buffer level values and different cellular communication protocols (and/or pairs, sets, or types thereof). In one or more implementations, the memory 204 may store different minimum jitter buffer level variances associated with the different cellular communication protocols (and/or types thereof). In this regard, the electronic devices 102, 104 may determine a joint minimum jitter buffer level based on their individual jitter buffer usage over a particular period of time, and then may add the minimum jitter buffer level variance to their determined minimum jitter buffer level. In one or more implementations, when the link is utilizing cellular communication protocols that are generally stable, such as 3G, LTE, etc., the minimum jitter buffer level variance may be set to zero.

After setting the minimum jitter buffer level, the electronic device 102 may transmit application data (e.g., audio and/or video data) and/or control data (e.g., control signaling messages) for the multimedia conference session to the other electronic device 104 via the primary connection, and may concurrently transmit a copy of at least a portion of the control data to the other electronic device 104 over the secondary connection (408). The portion of the control data may include control data and/or control messages that may facilitate a smooth user experience for the communication session. For example, the portion of the control data may include, for example, request for key frames, session termination messages, and the like.

The electronic device 102 may detect a degradation of the primary connection (410). For example, the electronic device 102 may utilize one or more degradation factors to determine when the primary connection is degrading. The degradation factors may include whether one or more link quality metrics fall below particular link quality threshold. The link quality metrics may include, for example, one or more of roundtrip time, the number of packets sent, the number of packets received, were the responses received out of order (e.g., based on timestamps), whether a response was received or a timeout occurred, received signal strength indication (RSSI), and the like. Since some cellular communication protocols may degrade more rapidly than others (such as 5G millimeter wave communications), the electronic device 102 may utilize different degradation factors for different cellular communication protocols (and/or types thereof). For example, a link quality threshold value may be set higher for 5G millimeter wave communications (which may degrade rapidly) than for LTE communications.

After detecting the degradation of the primary connection (410), the electronic device 102 may switch to transmitting the application and control data over the secondary connection (412). For example, the electronic device 102 may transmit a copy of the application and control data over the secondary connection (while concurrently attempting to transmit the application and control data over the primary connection), or the electronic device 102 may effectively make the secondary connection the primary connection and select another link to become the secondary connection.

Responsive to the switch (412), the electronic device 102 adjusts the minimum jitter buffer level to a second jitter buffer level that is determined based on the second cellular communication protocol used by the secondary connection (414). Thus, the second minimum jitter buffer level may differ (e.g., may be greater than or less than) the first minimum jitter buffer level that was used in conjunction with the first cellular communication protocol.

FIG. 5 illustrates a flow diagram of an example process 500 of cellular communication protocol aware adaptive bit rate multimedia streaming in accordance with one or more implementations. For explanatory purposes, the process 500 is primarily described herein with reference to the electronic devices 102, 104 of FIG. 1. However, the process 500 is not limited to the electronic devices 102, 104 of FIG. 1, and one or more blocks (or operations) of the process 500 may be performed by one or more other components of the server 108 and by other suitable devices (e.g., any of the electronic devices 102-104). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The electronic device 102 establishes a link for communicating a video stream to another electronic device 104 (502). The electronic device 102 may receive an indication that the other electronic device 104 is utilizing a first cellular communication protocol for the link (504). The electronic device 102 may receive the indication from the electronic device 104 and/or from an intermediary relay server. In one or more implementations, the electronic device 102 may be utilizing the Wi-Fi communication protocol for the link, and/or the electronic device 102 may be utilizing the first cellular communication protocol or another cellular communication protocol.

The electronic device 102 may select, based on a stored association with the first cellular communication protocol, a first set of bit rates for communicating the video stream to the electronic device 104 (506). The first set of bit rates may be stored in the memory 204 in association with the first cellular communication protocol, while a second, different, set of bit rates may be stored in the memory 204 in association with a second cellular communication protocol, a third, different, set of bit rates may be stored in the memory 204 in association with a third cellular communication protocol, and so on. In one or more implementations, the set of bit rates may include higher bit rates when the both of the electronic devices 102, 104 are utilizing Wi-Fi or the 5G cellular communication protocol, and the set of bit rates may include lower bit rates when one of the electronic devices is utilizing a different cellular communication protocol.

The electronic device 102 provides an indication of the first set of bit rates for transmission over the link to the other electronic device 104 (508). The electronic device 102 receives, from the other electronic device 104, a selection of one of the first set of bit rates (510), and the electronic device 102 provides, for transmission to the other electronic device 104 over the link, the video stream at the selected one of the first set of bit rates (512).

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information, or publicly available information.

Figure 6:
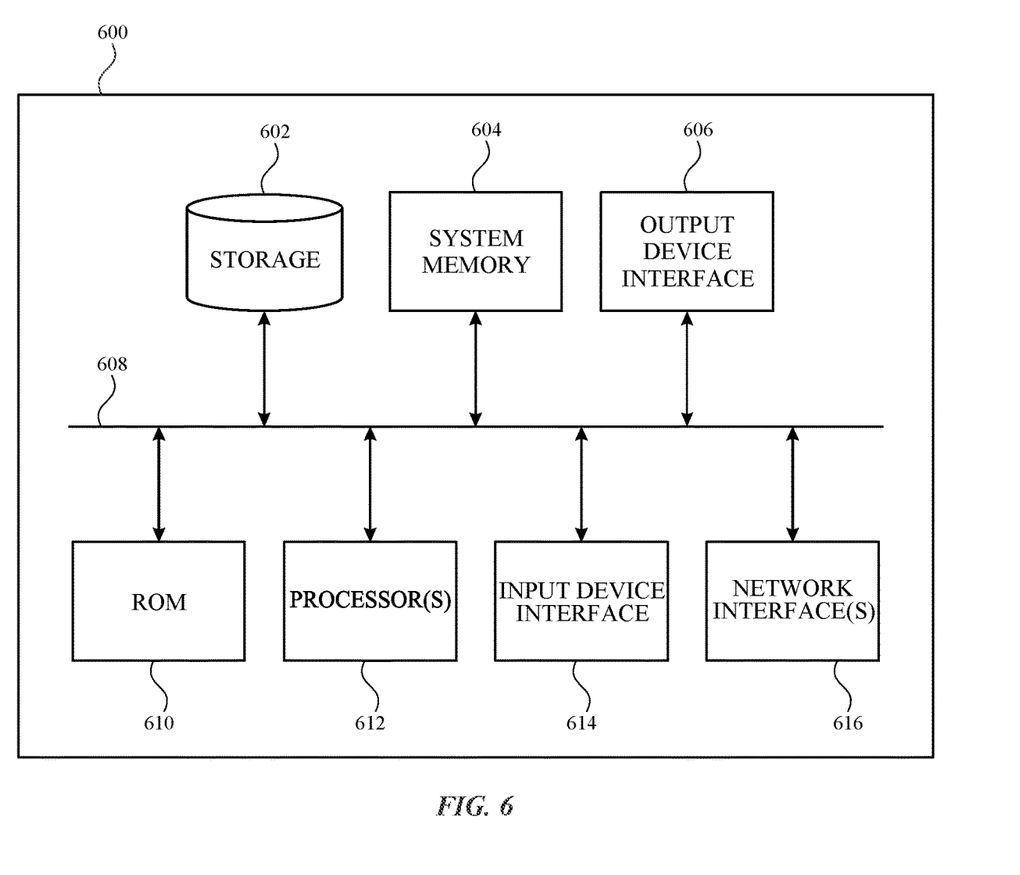
FIG. 6 illustrates an example electronic system with which aspects of the subject technology may be implemented in accordance with one or more implementations.

FIG. 6 illustrates an electronic system 600 with which one or more implementations of the subject technology may be implemented. The electronic system 600 can be, and/or can be a part of, one or more of the electronic devices 102-104, and/or one or the server 108 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the server 108 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   establishing, by an electronic device, a link for a communication session with another electronic device, wherein the link utilizes at least one of a first cellular communication protocol or a second cellular communication protocol that differs from the first cellular communication protocol;
   selecting a bit rate for a video stream to be provided over the link to the other electronic device based at least in part on whether the link utilizes the first cellular communication protocol or the second cellular communication protocol, wherein a first bit rate is selected when the link utilizes the first cellular communication protocol and a second bit rate, different from the first bit rate, is selected when the link utilizes the second cellular communication protocol;
   setting a minimum jitter buffer level for the communication session based at least in part on whether the link utilizes the first cellular communication protocol or the second cellular communication protocol; and
   providing, for transmission over the link to the other electronic device, the video stream at the selected bit rate.

2. The method of claim 1, wherein the first cellular communication protocol comprises a first type that utilizes a first frequency spectrum and a second type that utilizes a second frequency spectrum, different from the first frequency spectrum.

3. The method of claim 2, wherein when the link utilizes the first cellular communication protocol, the communication session comprises a multimedia conference session with the other electronic device, the video stream is provided for transmission as part of the multimedia conference session with the other electronic device, and the minimum jitter buffer level is set to a first level when the first cellular communication protocol is the first type and a second level, different from the first level, when the first cellular communication protocol is the second type.

4. The method of claim 3, wherein the first frequency spectrum comprises a millimeter wave spectrum.

5. The method of claim 3, wherein the first cellular communication protocol is the first type and the method further comprises:
  switching from the link to another link for communicating with the other electronic device, the other link utilizing the first cellular communication protocol having the second type; and
  responsive to the switching, adjusting the minimum jitter buffer level for the multimedia conference session from the first level to the second level.

6. The method of claim 1, further comprising:
  receiving an indication of a user bandwidth consumption preference, wherein the bit rate is selected based in part on the user bandwidth consumption preference and whether the link utilizes the first cellular communication protocol or the second cellular communication protocol.

7. The method of claim 6, further comprising:
  receiving a cellular carrier indication of a bandwidth consumption cost, wherein the bit rate is selected based at least in part on the cellular carrier indication, the user bandwidth consumption preference, and whether the link utilizes the first cellular communication protocol or the second cellular communication protocol.

8. The method of claim 1, wherein the selecting is performed based at least in part on whether the link utilizes the first cellular communication protocol or the second cellular communication protocol and independent of current bandwidth availability corresponding to the first or second cellular communication protocols.

9. The method of claim 1, further comprising:
  receiving an indication that the at least one of the first cellular communication protocol or the second cellular communication protocol is utilized for the link at the other electronic device.

10. The method of claim 9, wherein a Wi-Fi communication protocol is utilized for the link at the other electronic device.

11. The method of claim 1, wherein selecting the bit rate for the video stream further comprises:
  selecting a first plurality of bit rates associated with the first cellular communication protocol when the link utilizes the first cellular communication protocol or selecting a second, different, plurality of bit rates associated with a second communication protocol when the link utilizes the second communication protocol;
  providing, for transmission to the other electronic device, an indication of the first or second plurality of bit rates as potential bit rates; and
  receiving, from the other electronic device, a response indicating at least one of the potential bit rates.

12. The method of claim 1, wherein the first cellular communication protocol comprises one of 3G, 4G, or 5G, and the second cellular communication protocol comprises a different one of 3G, 4G, or 5G.

13. An electronic device comprising:
  a memory; and
  at least one processor configured to:
    establish a primary connection for a multimedia conference session with another electronic device, the primary connection utilizing a first cellular communication protocol;
    establish a secondary connection for the multimedia conference session, the secondary connection utilizing a second cellular communication protocol that differs from the first cellular communication protocol;
    set a minimum jitter buffer level for the multimedia conference session to a first jitter buffer level value;
    transmit application data and control data for the multimedia conference session over the primary connection and concurrently transmit at least a portion of the control data over the secondary connection;
    during the multimedia conference session, switch to transmission of the application and control data over the secondary connection; and
    responsive to the switch, adjust the minimum jitter buffer level for the multimedia conference to a second jitter buffer level value that differs from the first jitter buffer level value.

14. The electronic device of claim 13, wherein the first jitter buffer level value is pre-stored in the memory in association with the first cellular communication protocol and the second jitter buffer level value is pre-stored in the memory in association with the second cellular communication protocol.

15. The electronic device of claim 13, wherein the first cellular communication protocol comprises one of 3G, 4G, or 5G, and the second cellular communication protocol comprises another of 3G, 4G, or 5G.

16. The electronic device of claim 13, wherein the first cellular communication protocol comprises a first type that utilizes a first frequency spectrum and a second type that utilizes a second frequency spectrum, different than the first frequency spectrum.

17. The electronic device of claim 16, wherein the at least one processor is further configured to:
  determine that the primary connection is degrading based on at least one degradation factor, wherein the at least one degradation factor comprises a first degradation factor when the first cellular communication protocol comprises the first type and a second degradation factor, different than the first degradation factor, when the first cellular communication protocol comprises the second type; and
  switch to transmission of the application and control data over the secondary connection responsive to the determination.

18. A non-transitory machine-readable medium storing instructions that, when executed by one or more processors, cause the one or more processors to perform operations comprising:
  establishing, by an electronic device, a link for communicating a video stream to another electronic device;
  receiving, by the electronic device, an indication that the other electronic device is utilizing a first cellular communication protocol for the link;

selecting, based on an association with the first cellular communication protocol, a first set of bit rates for communicating the video stream, the first set of bit rates being associated with the first cellular communication protocol and a second, different, set of bit rates being associated with a second cellular communication protocol that differs from the first cellular communication protocol;

providing, for transmission over the link to the other electronic device, an indication of the first set of bit rates;

receiving, from the other electronic device, a selection of one of the first set of bit rates; and providing, for transmission over the link to the other electronic device, the video stream at the one of the first set of bit rates.

19. The non-transitory machine-readable medium of claim 18, wherein the operations further comprise:

after providing, for transmission over the link to the other electronic device, the video stream at the one of the first set of bit rates, receiving another indication that the other electronic device has switched to the second cellular communication protocol for the link;

responsive to receiving the indication, selecting the second set of bit rates associated with the second cellular communication protocol for communicating the video stream;

providing, for transmission over the link to the other electronic device, another indication of the second set of bit rates;

receiving, from the other electronic device, a selection of one of the second set of bit rates; and providing, for transmission over the link to the other electronic device, the video stream at the one of the second set of bit rates.

20. The non-transitory machine-readable medium of claim 18, wherein the operations further comprise:

prior to the establishing, storing a first association between the first set of bit rates and the first cellular communication protocol and a second association between the second set of bit rates and the second cellular communication protocol.

21. The non-transitory machine-readable medium of claim 18, wherein the video stream is provided for transmission as part of a communication session and the operations further comprise:

setting a minimum jitter buffer level for the communication session based at least in part on whether the link utilizes the first cellular communication protocol or the second cellular communication protocol.

* * * * *